R. KEESE.
Churn.
No. 48,182.
Patented June 13, 1865.
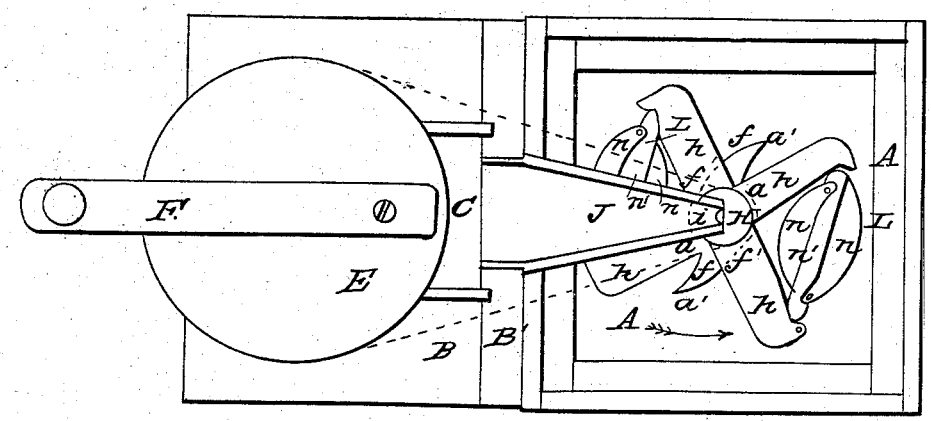
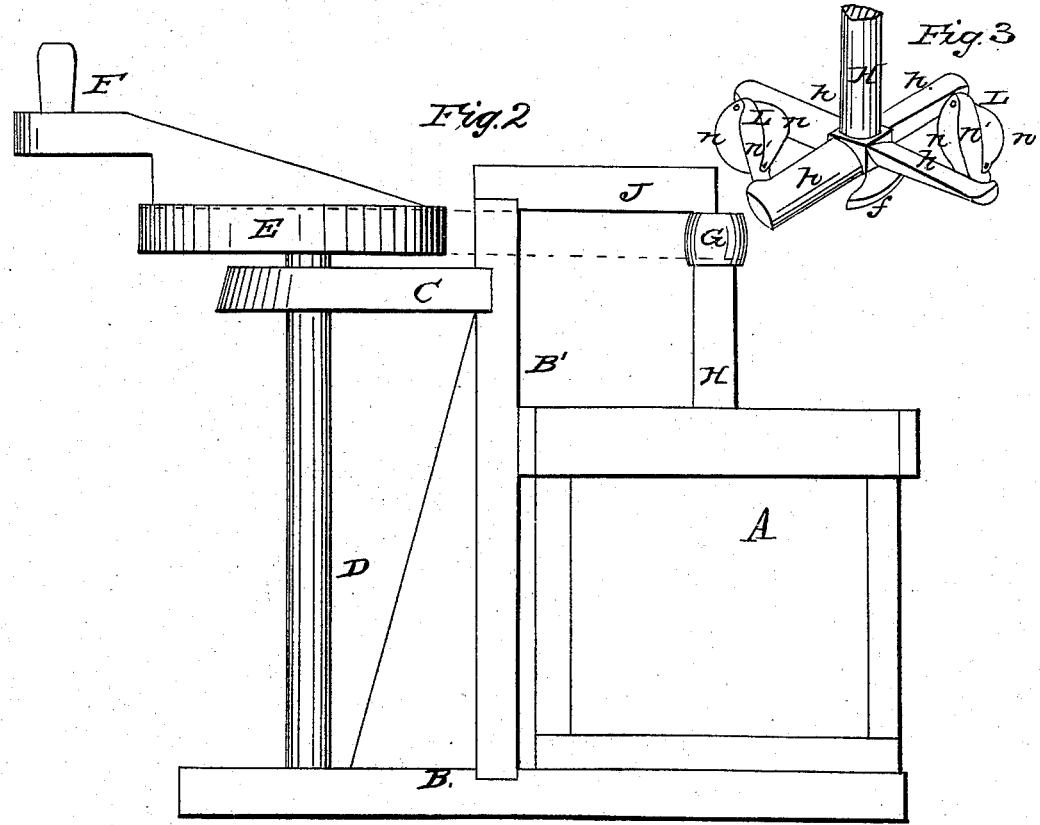
Witnesses
Inventor
R Keese

UNITED STATES PATENT OFFICE.

R. KEESE, OF CARDINGTON, OHIO.

IMPROVEMENT IN CHURNS.

Specification forming part of Letters Patent No. 48,182, dated June 13, 1865.

*To all whom it may concern:*

Be it known that I, R. KEESE, of Cardington, in the county of Morrow and State of Ohio, have invented certain new and useful Improvements in Churns; and I do hereby declare that the following is a full and complete description of the construction and operation of the same, reference being had to the accompanying drawings, making a part of this specification, in which—

Figure 1 is a top view of the churn. Fig. 2 is a side elevation. Fig. 3 is a perspective view of the dasher detached.

Like letters of reference refer to like parts in the views.

My improvement relates to churns, as hereinafter described.

A is the churn, which can be of any appropriate form. (Represented square in the drawings.) It is placed on a platform or board, B, beside a standard, B'. From the standard extends out a piece, C, through which a shaft, D, passes, that turns in the platform at the lower end, and to the upper end is secured a pulley, E, which is revolved by a handle, F, attached to it, that operates the churn by means of a belt extending from the pulley E to the pulley G on the upper end of the shaft H of the dasher, as indicated by the dotted lines.

The dasher or beaters are constructed and formed as represented in Figs. 1 and 3.

The cross-arms or beaters $h$ are curved diagonally in their position on the shaft, being rounded on one side and inclined more direct on the other. Between the arms are two revolving beaters, L, opposite each other, constructed with wings or paddles $n$, secured round a small shaft, $n'$, that is pivoted at each end to the arms.

Underneath the cross-arms $h$, to the shaft H, is secured a sweep, $f$, that projects on opposite sides between the arms, where there are no rotating beaters. This sweep is formed as represented and indicated by the dotted lines $f'$ in Fig. 1, being curved round from $a$ to $a'$ on opposite sides and curved inward on the other side.

The dasher, when it is in its position in the churn, occupies the lower part of it, and is kept in place as it revolves by means of the lower end of the shaft turning in a point and step in the bottom of the churn, and the upper end, having its bearing at $i$ in an arm, J, extending out from the standard B', which, together with the belt, being adjusted over the pulley G, retains the shaft in its vertical position. By turning the pulley E the dasher is revolved with ease, more or less rapidly, as may be desired, which, with the action of the revolving beaters, agitates and churns the milk or cream in the most perfect manner. In churning the milk the dasher is turned in the direction of the arrow, when the curves $a\ a'$ of the sweep will strike against the milk, throwing and scattering it from under the beaters round in the churn.

What I claim as my improvement, and desire to secure by Letters Patent, is—

The rotating winged beaters L, cross-arms or beaters $h$, in combination with the sweep $f$, when arranged and operating as and for the purpose set forth.

R. KEESE.

Witnesses:
   G. W. HULL,
   S. W. COOK.